(12) United States Patent
Campaioli (10) Patent No.: US 10,762,405 B2
(45) Date of Patent: Sep. 1, 2020

(54) SYSTEM AND METHOD FOR EXTRACTING BITSTREAM DATA IN TWO-DIMENSIONAL OPTICAL CODES

(71) Applicant: Datalogic IP Tech S.r.l., Lippo di Calderara di Reno (Bologna) (IT)

(72) Inventor: Enrico Campaioli, Lippo di Calderara di Reno (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 127 days.

(21) Appl. No.: 16/169,921

(22) Filed: Oct. 24, 2018

(65) Prior Publication Data

US 2019/0130236 A1    May 2, 2019

Related U.S. Application Data

(60) Provisional application No. 62/577,350, filed on Oct. 26, 2017.

(51) Int. Cl.

| | | |
|---|---|---|
| *G06K 19/06* | (2006.01) | |
| *G06K 9/20* | (2006.01) | |
| *G06T 7/68* | (2017.01) | |
| *G06K 7/14* | (2006.01) | |
| *G06K 9/46* | (2006.01) | |

(52) U.S. Cl.
CPC ..... *G06K 19/06037* (2013.01); *G06K 7/1417* (2013.01); *G06K 9/2063* (2013.01); *G06K 9/4604* (2013.01); *G06T 7/68* (2017.01)

(58) Field of Classification Search
CPC ........... G06K 19/06037; G06K 9/2063; G06K 7/1417; G06K 9/4604; G06K 9/3216; G06K 9/3233; G06K 9/18; G06T 7/68
See application file for complete search history.

(56) References Cited

U.S. PATENT DOCUMENTS

| | | | |
|---|---|---|---|
| 5,134,272 A * | 7/1992 | Tsuchiya | ............ G06K 7/10871 235/462.08 |
| 6,137,893 A | 10/2000 | Michael et al. | |
| 6,340,119 B2 | 1/2002 | He et al. | |
| 6,487,516 B1 | 11/2002 | Amorai-Moriya | |
| 6,601,772 B1 | 8/2003 | Rubin et al. | |
| 6,823,077 B2 | 11/2004 | Dietz et al. | |
| 6,865,273 B2 | 3/2005 | Wendt | |

(Continued)

FOREIGN PATENT DOCUMENTS

EP    1286299 B1    6/2009

*Primary Examiner* — Christopher M Brandt
(74) *Attorney, Agent, or Firm* — Stoel Rives LLP (57) ABSTRACT

The disclosure relates to a data reading system and method for identifying and processing optical code symbols, primarily DotCode symbols. The data reading system includes an imager for obtaining an image of an item containing the DotCode symbol and a processor for analyzing the image for ultimately decoding the data from the DotCode symbol. The processor analyzes the obtained image to determine a starting pattern for the DotCode symbol and to begin building the DotCode grid from the starting pattern. Once the DotCode grid has been completed, the processor generates a label hypothesis based on the identified data dots on the DotCode grid. Thereafter, a decoder unit receives the label hypothesis from the processor and decodes the label hypothesis to obtain the data for the DotCode symbol.

20 Claims, 6 Drawing Sheets

(56) References Cited

U.S. PATENT DOCUMENTS

| | | | |
|---|---|---|---|
| 6,880,755 B2 | 4/2005 | Gorbet et al. | |
| 7,260,259 B2 | 8/2007 | Comaniciu et al. | |
| 7,619,607 B2 | 11/2009 | Zhang et al. | |
| 7,712,664 B2 | 5/2010 | Takahashi et al. | |
| 7,848,571 B2 | 12/2010 | Ratner et al. | |
| 7,980,473 B2 | 7/2011 | Zhang et al. | |
| 8,011,596 B2 | 9/2011 | Longacre, Jr. | |
| 8,152,070 B2 | 4/2012 | Al-Hussein et al. | |
| 8,224,018 B2 | 7/2012 | Rhoads et al. | |
| 8,306,274 B2 | 11/2012 | Grycewicz | |
| 8,326,013 B2 | 12/2012 | Goto | |
| 8,442,322 B2 | 5/2013 | Aoki et al. | |
| 9,946,947 B2 | 4/2018 | Stokes et al. | |
| 2009/0200386 A1* | 8/2009 | Longacre, Jr. | G06K 19/06037 235/494 |
| 2011/0262047 A1* | 10/2011 | Wei | G06K 19/06037 382/232 |
| 2012/0145779 A1* | 6/2012 | Bietenbeck | G06K 19/06037 235/375 |
| 2012/0298754 A1* | 11/2012 | Lin | G06K 19/06037 235/462.11 |
| 2014/0016145 A1* | 1/2014 | Malik | H04N 1/405 358/1.9 |
| 2014/0119665 A1* | 5/2014 | Stokes | G06K 9/4604 382/201 |

\* cited by examiner

SYSTEM AND METHOD FOR EXTRACTING BITSTREAM DATA IN TWO-DIMENSIONAL OPTICAL CODES

RELATED APPLICATIONS DATA

This application is a nonprovisional of and claims the benefit under 35 U.S.C. § 119(e) of U.S. Provisional Patent Application No. 62/577,350 filed Oct. 26, 2017, the disclosure of which is incorporated by reference herein in its entirety.

BACKGROUND

The field of the present disclosure relates generally to data reading systems and machine-readable symbols, and in particular, to systems and methods for extracting bitstream data in two-dimensional optical codes, such as DotCode symbology.

Generally speaking, optical codes are machine-readable representations of data typically comprising of a pattern of dark elements and light spaces. For example, one-dimensional codes, such as a Universal Product Code ("UPC") and EAN/JAN codes, comprise parallel lines of varying widths and spaces. Two-dimensional codes, such as PDF417, Maxicode codes, and DotCode codes may comprise other features, such as rectangles, dots, hexagons and other geometric patterns in two dimensions. Originally, optical codes were scanned by specialized optical scanners called optical code readers (e.g., barcode readers). More recent application software developments have provided the ability for other electronic devices, such as phones and cameras, to read barcodes and other optical codes.

Data reading devices, such as optical code (e.g., barcode) scanners/readers, RFID readers, and the like, are widely used to read data in the form of optical codes, digital watermarks, or other encoded symbols printed on various objects. These systems may be used in a wide variety of applications, such as inventory control and point-of-sale transactions in retail stores. Many of these data reading systems incorporate an image sensor, or imager, which acquires images of the item and optical code. The captured data is thereafter transmitted to a host processing device for decoding the data. In some instances, the optical codes may be arranged or located on objects that include many additional images, features, and background text. Accordingly, to successfully obtain data from the optical codes, the data readers must be able to distinguish the target optical codes from the surrounding environment.

As briefly noted previously, two-dimensional optical codes, such as DotCode, include black and white modules arranged in either a square or rectangular matrix pattern. Within the borders of the optical code are rows and columns of cells encoding information. For example, in DotCode symbology, the symbol includes a rectangular array of disconnected dots organized on a grid diagonal to that rectangular, similar to the dark squares on a checkerboard. The alternating dot positions are called data dot locations and are the only positions that could be used for data encoding.

When decoding two-dimensional optical codes from images, a data reader is used to identify regions in the image having a high likelihood of containing the target code. Once such regions are found, the data reader focuses on determining whether these regions contain the target code, thereby reducing overall processing time. In many data reading systems, this process is time-consuming and can prove to be challenging, especially when handling complex symbologies. For example, a common bitstream extracting method for handling DotCode symbology relies on Fast Fourier Transform methodologies and requires hardware with robust computational power and memory size. While such data reading methods may be appropriate for larger systems, these methods are difficult to implement in a smaller data reader system.

Accordingly, the present inventor has determined that it would be desirable to develop a data reading system with improved performance to accurately read and process two-dimensional optical codes, such as DotCode, using low-cost components and applying robust and efficient computational processes. Additional aspects and advantages will be apparent from the following detailed description of example embodiments, which proceeds with reference to the accompanying drawings. It should be understood that the drawings depict only certain example embodiments and are not to be considered as limiting in nature.

DETAILED DESCRIPTION OF EXAMPLE EMBODIMENTS

With reference to the drawings, this section describes particular embodiments of a data reading methodology and its detailed construction and operation. Throughout the specification, reference to "one embodiment," "an embodiment," or "some embodiments" means that a particular described feature, structure, or characteristic may be included in at least one embodiment of the data reading process. Thus, appearances of the phrases "in one embodiment," "in an embodiment," or "in some embodiments" in various places throughout this specification are not necessarily all referring to the same embodiment. Furthermore, the described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

With collective reference to the figures, the following disclosure relates generally to an improved system and method for detecting and locating optical codes. In particular, the disclosure relates to methods for detecting and processing DotCode symbols. As noted previously, some DotCode reading systems use Fourier Transform methodologies and/or image processing techniques to read DotCode symbologies. However, such methods typically require complex and/or robust hardware components to handle the rigorous algorithms and calculations needed to properly process the DotCode symbols. Accordingly, it may be advantageous to provide an improved and streamlined approach.

The following description relates to an improved approach for data reading processes. It should be understood that while the disclosure may be specifically described with relation to DotCode symbologies, the disclosure is meant to illustrate an example embodiment and is not necessarily intended to be limited to that specific optical code type. In other words, the methods and systems described herein may be applicable to other optical codes and symbols that are not specifically described. Additional details of these and other embodiments are further discussed below with particular reference to the accompanying figures.

Figure 1:
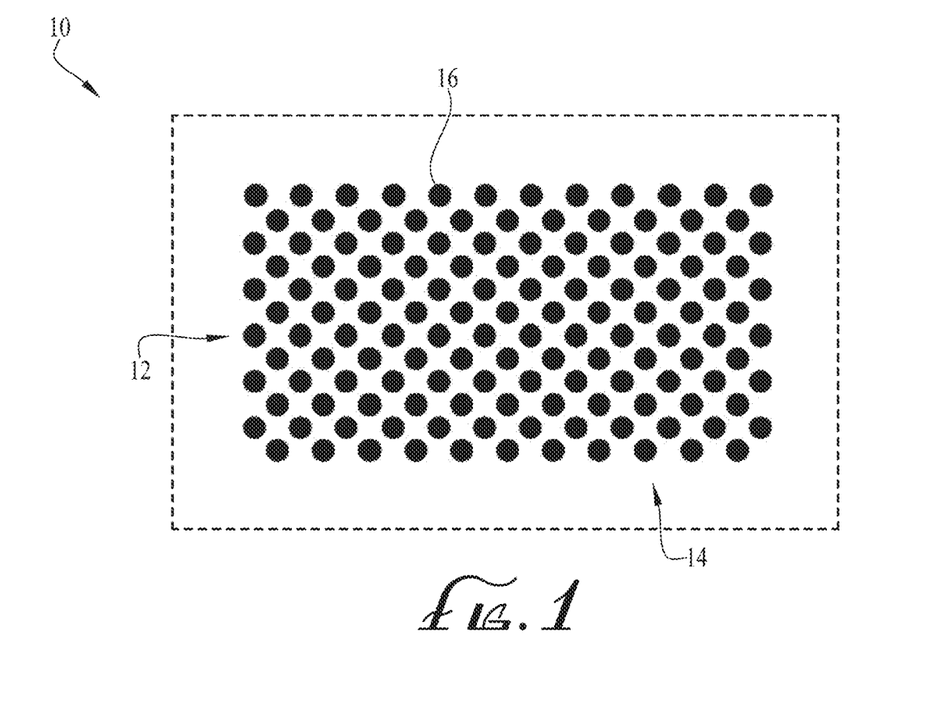
FIG. 1 illustrates an example embodiment of a matrix array illustrating potential data dot locations for DotCode symbology.

Generally speaking, a DotCode is a type of optical code that encodes data in an array of disconnected dots. There are various types of DotCodes used for encoding data. FIG. 1 illustrates an example embodiment of a matrix array 10 for a DotCode symbology. The matrix array 10 includes a plurality of columns 12 and rows 14. DotCode symbology typically has few constraints, as the array 10 may include any number of columns 12 and rows 14 as long as the sum of columns 12 and rows 14 is an odd number. The number of columns 12 establishes the maximum width (i.e., length) of the DotCode symbol, while the number of rows 14 establishes the maximum height of the DotCode symbol. Within the matrix array 10 is included a number of alternating data dot locations 16 that may resemble a diagonal pattern as illustrated in FIG. 1. The alternating data dot locations 16 establish positions on the matrix array 10 made available for data encoding, with the remaining positions left blank where no data can be printed. In other words, a DotCode symbol can only comprise of a pattern of printed dots formed from the overall diagonal dot pattern of the matrix array (see example in FIG. 2). The orientation of a DotCode symbol is established by the requirement that sum of the columns 12 and rows 14 is odd. This requirement always produces an array 10 that cannot be an exact square and that always has at most two corner positions that are data dot locations (i.e., locations where dots can be printed) and two corner positions that are not data dot locations (i.e., locations that remain blank). It thus becomes possible to unfold the data dot locations 16 into a stream of bits containing the encoded data.

Figure 2:
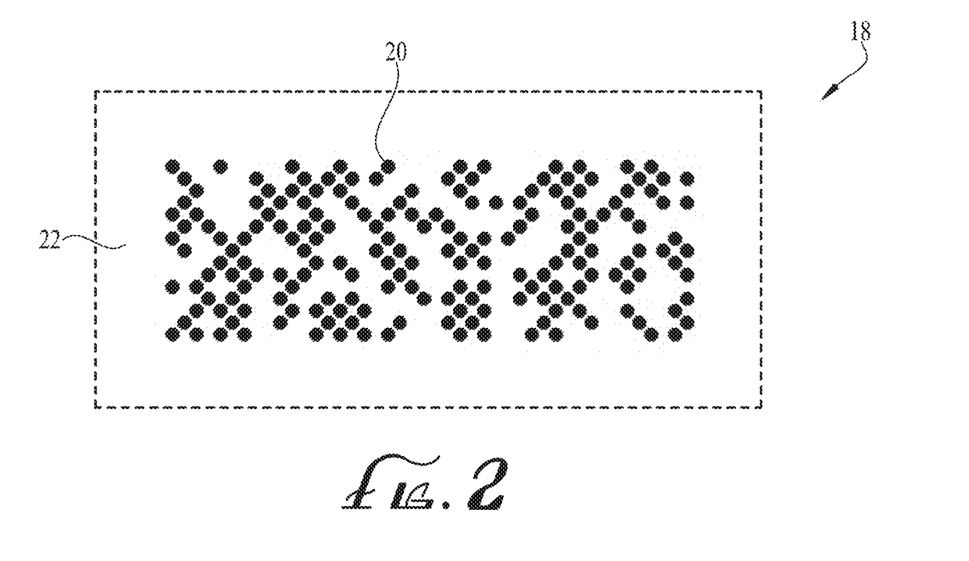
FIG. 2 illustrates an example embodiment of a DotCode symbol encoding data.

FIG. 2 illustrates an example embodiment of a DotCode symbol 18 which can encode data in full ASCII, extended ASCII and pure binary sequences. With reference to FIG. 2, the DotCode symbol 18 includes a plurality of printed, disconnected dots 20, where each printed dot represents a bit equal to 1, while a blank space (i.e., the absence of dots) represents a bit set to 0. The DotCode symbol 18 further includes a quiet zone 22 surrounding the dots 20, the quiet zone 22 having a width at least equal to the width of three dots in some embodiments. The quiet zone 22 is a region free of any text or markings that defines the exterior printing boundary of the DotCode symbol 18. Accordingly, any markings or text present in the quiet zone 22 may interfere with the reading process, and may result in the DotCode symbol 18 being unreadable by a data reader. Unlike many other optical code symbologies, DotCode symbols 18 do not have a standard finder pattern that indicates a starting location for the data reader to obtain and decode the data, thereby making DotCode symbols 18 more challenging to read than other two-dimensional codes.

Like many barcodes and other optical codes, DotCode symbols 18 may be affixed to items to encode data relating to the item. For example, in a retail establishment, barcodes and other optical codes are typically affixed to goods that are on display for purchase. Typically, a data reader is used to capture and process the barcode or other optical code to obtain the encoded data. The data reader may be implemented as a fixed device, where the items are transported or moved across a field of view of the data reader, or a mobile handheld device that can be moved by an operator to aim and capture the codes on the item. In some systems, the data reader includes one or more image sensors, or imagers, that acquire an image of the item and the barcode symbol on the item for further processing and decoding by the data reader.

It should be understood that reference to a "data reader" in the specification is used in an expansive sense to describe a data reader that may include a laser scanner, a camera/imager or other imaging system including video imaging, a microprocessor, a decoding unit, a controller for communicating data to other data readers or external systems, and any combination thereof. The decoding unit of the data reader may include different decoders (e.g., software algorithms, hardware constructs) configured to decode various types of optical codes including one-dimensional (e.g., linear) codes, (e.g., UPC, codabar, code 25, code 39, code 93, code 128, code 11, EAN8, EAN13, plessey, POSTNET) two-dimensional (e.g., matrix) codes (e.g., DotCode, aztec code, maxicode, QR code, high-capacity color barcode, data matrix) stacked codes (PDF417, GS1 Databar), and watermark and feature recognition. It should be understood that the term "data reader" is not intended to be limited to require each of these components. In some embodiments, a data reader may include a camera or other imaging system, and may not include a processor, decoding unit, and the controller. These components may be entirely external to the data reader itself, such as being a part an external system with which the data reader communicates. For example, the data reader may be a camera that obtains images of the item and communicates (e.g., transmits) those images to an external database for decoding and processing. While it is generally understood that a camera is typically a combination of a lens and an imaging device or sensor array, the terms imager (or imaging system) and camera may be used interchangeably herein.

Embodiments of the disclosure include a data reading system. The data reading system comprises an imager configured to obtain an image of an item containing an optical code symbol including a plurality of data dots, and a processor in operable communication with the imager. The processor is configured to determine a starting position for identifying the optical code symbol, wherein the starting position corresponds to a first data dot of the plurality of data dots, analyze the starting position of the image and validate a location of the first data dot, analyze a first region surrounding the first data dot to identify a subset of data dots surrounding the first data dot, determine a cluster arrangement of the first data dot and the subset of data dots, identify a starting pattern containing the first data dot and at least one of the subset of data dots, determine a starting pattern of the optical code based on an arrangement of the first data dot and the additional data dots, analyze multiple regions of the image beginning from the starting pattern to identify one or more additional data dots of the plurality of data dots in the image, and generate a label hypothesis based on the first data dot, the subset of data dots, and the one or more additional data dots, wherein the label hypothesis represents the optical code symbol. The data reading system may further include a decoder unit in operable communication with the processor. The decoder unit may be configured to receive the label hypothesis from the processor and decode the label hypothesis to obtain data relating to the optical code symbol.

In another embodiment, a data reader, comprises an imager configured to capture an image of an optical code symbol including a data dot symbol, and a processor operably coupled with the imager. The processor may be configured to determine a first data dot within the data dot symbol, determine a starting pattern containing the first data dot and at least two subsets of data dots that extend in different directions relative to each other, determine additional dots within the data dot symbol at add to a data dot grid by a growth analysis extending from the starting pattern until only blank spaces are found surrounding other blank spaces, and transmit a label hypothesis for the determined data dot grid to a decoder unit for decoding and translation to an output string.

As mentioned previously, conventional data readers capable of reading DotCode symbology typically use complex algorithms or calculations (e.g., Fast Fourier Transform) or require rigorous image processing techniques to extract and decode DotCodes. As described in further detail below with reference to FIGS. 3-9, the following describes an improved data reading system and method for reading DotCode symbols using a streamlined approach to identify, extract, and process DotCode symbols from an image without concern that surrounding characters or text may obscure the symbol. The image processing techniques described herein allow the data reader to classify and distinguish the barcode from surrounding text, images, and noisy environments.

As noted previously, DotCode symbology utilizes a rectangular matrix array with diagonal data dot locations that define the locations in the array that may include encoded data. Because DotCode provides such a fixed arrangement and alignment of dots, it is well-suited for employing image processing techniques to extract and decode the data. Using contouring identification features and image analysis, the data reader is able to identify the location of the dots in the image and extract the data encoded in the DotCode symbol.

Embodiments of the disclosure include a data reading method. The data reading method comprises obtaining, via an imager, an image of an item containing an optical code symbol including a plurality of data dots; determining, via a processor, a starting position for identifying the optical code symbol, wherein the starting position corresponds to a first data dot of the plurality of data dots; analyzing, via the processor, a location of the first data dot; analyzing, via the processor, a first region surrounding the first data dot; identifying, via the processor, a subset of data dots surrounding the first data dot; determining, via the processor, a cluster arrangement of the first data dot and the subset of data dots; analyzing, via the processor, the cluster arrangement to determine a starting pattern containing the first data dot and at least one of the subset of data dots; analyzing, via the processor, multiple regions of the image beginning from the starting pattern to identify one or more additional data dots of the plurality of data dots in the image; generating, via the processor, a label hypothesis based on the first data dot, the subset of data dots, and the one or more additional data dots, wherein the label hypothesis represents the optical code symbol; and decoding, via a decoder unit, the label hypothesis to obtain data relating to the optical code symbol.

With collective reference to FIGS. 3-9, the following section describes additional details of these image processing techniques and data reading methods. In particular, FIGS. 3-7 provide details related to identifying a target starting pattern in the DotCode symbol 18. The identified target starting pattern may then be used to identify the remaining dots in the DotCode symbol 18 as provided by FIGS. 8-9.

Figure 3:
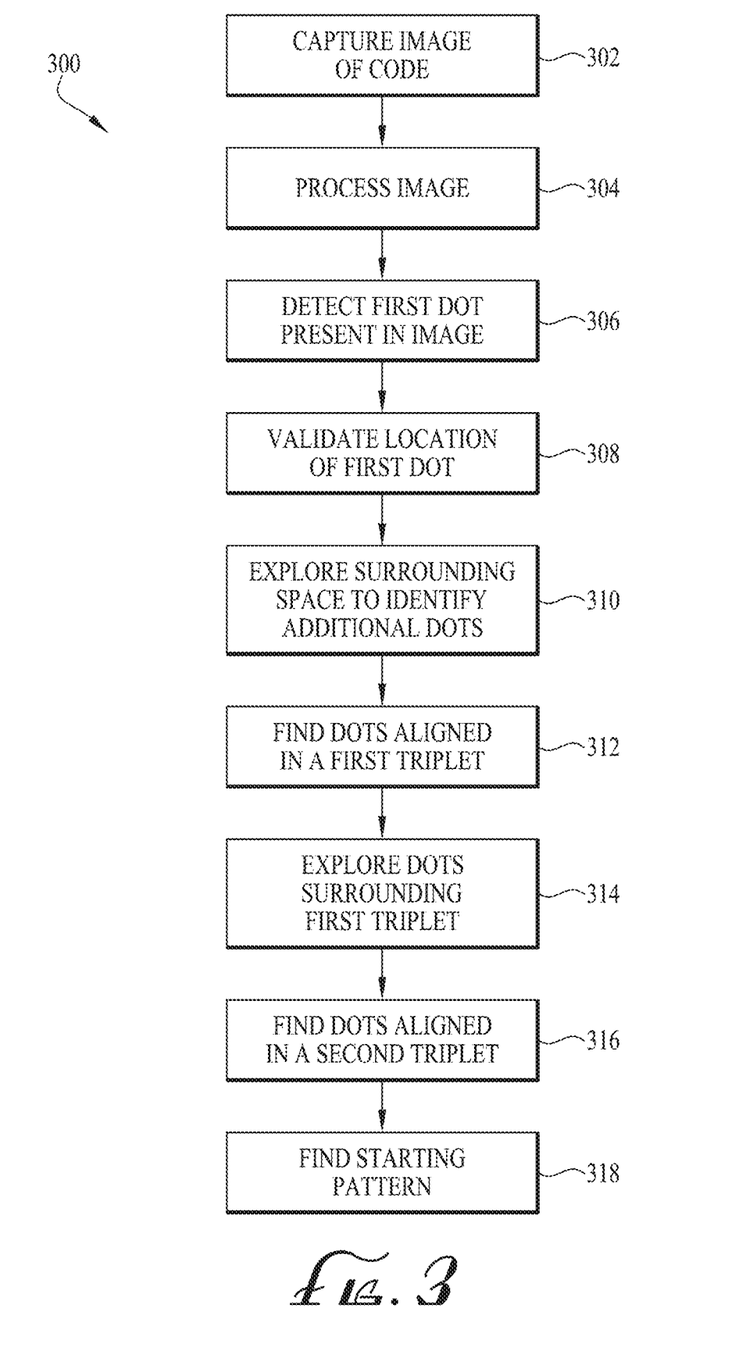
FIG. 3 is a flow chart illustrating a method for identifying a target starting pattern in the DotCode symbol.
Figure 4:
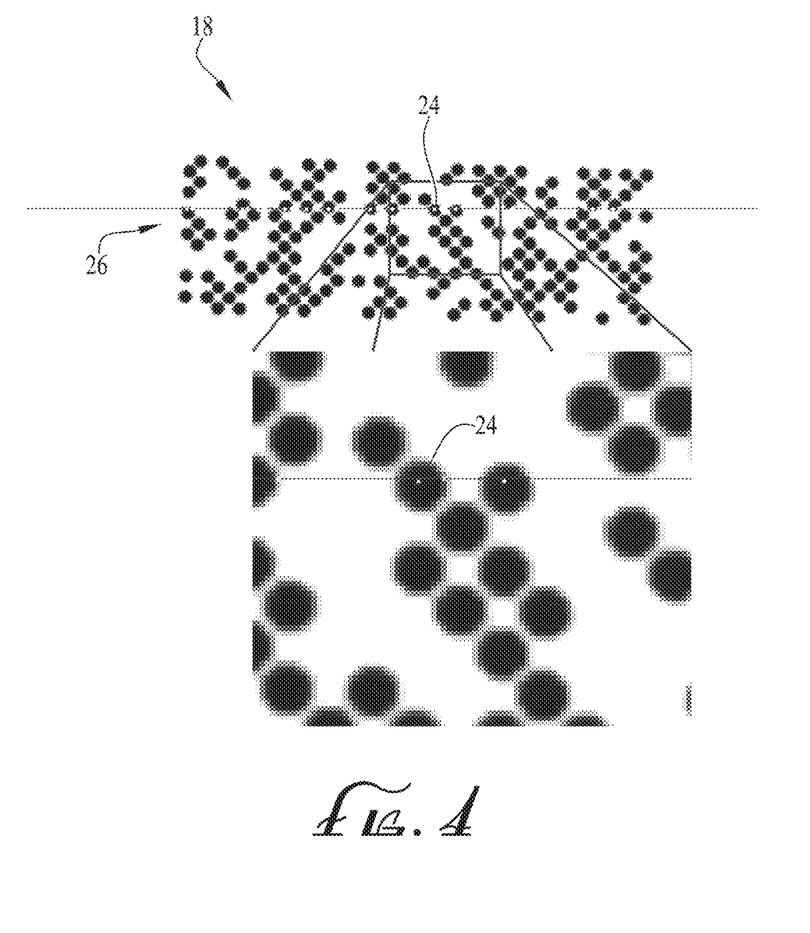
FIGS. 4-7 are example embodiments of DotCode symbology illustrating various details of the method steps of FIG. 3.
Figure 5:
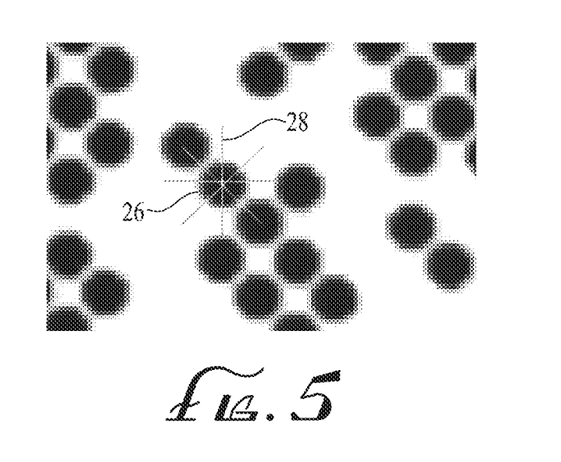

FIG. 3 is a flow chart illustrating a method 300 for identifying a target starting pattern in the DotCode symbol 18. FIGS. 4-7 are enlarged portions of example DotCode symbology illustrating the various steps and details of the method 300 of FIG. 3. With collective reference to FIGS. 3-7, the following describes details relating to a data reading method for handling DotCode symbology.

With particular reference to FIG. 3, the process begins at step 302, where an image of the optical code and the surrounding environment is captured by the data reader. After capturing the image, at step 304, the image may optionally be smoothed, filtered, or further processed as needed. At step 306, the image is analyzed to detect one or more dots that may be part of the DotCode symbol. For example, with reference to FIG. 4, the data reader analyzes the image and identifies a first dot 24 located on a horizontal line 26 (i.e., row) of the matrix array. It should be understood that the process may begin on any horizontal line of the matrix array, but for purposes of illustration, the center portion of the image is used in the illustrated figures. Other starting positions are also contemplated, such as a vertical scan line, a diagonal scan line, or other similar method. To identify the first dot 24, the data reader samples the horizontal line 26 and detects (e.g., extracts) transitions along the sampled horizontal line 26. The transitions may be detected based, at least in part, on determining local maxima and/or local minima of a derivative of the sampled signal. In particular, the local maxima and/or local minima may be compared to a threshold value to determine whether the local maxima or local minima satisfies the thresholding parameters. The thresholding parameter may be satisfied if the local maximum is greater than the threshold value and/or if the local minimum is less than the threshold value. In some embodiments, the threshold value may be calculated using the mean contrast of the obtained image. Other methods for determining the threshold value are also contemplated based on analyzing the obtained image or by using a pre-determined value as compared with another parameter of the image.

If the local maxima or local minima satisfies the thresholding parameters, this indicates the potential presence of the first dot 24. At step 308, a first hypothesis of the location of the first dot 24 is validated. The first dot 24 may be validated using a measurement radial probe 28 having multiple radial lines to identify and measure the edges of the dot 24 from a center point of the radial probe 28 (see FIG. 5). If the edges found by the measurement radial probe 28 are symmetric and equidistant from the center point, then the first dot 24 is confirmed and an accurate dot center for the first confirmed dot 24 is calculated. For clarification, the radial probe 28 is a probing process that uses radial lines to detect the edges or circumference of the dots. If the local maxima or local minima do not satisfy the thresholding parameters, the process may continue to analyze different images (e.g., along different scan lines) until a first confirmed dot is determined.

Figure 6:
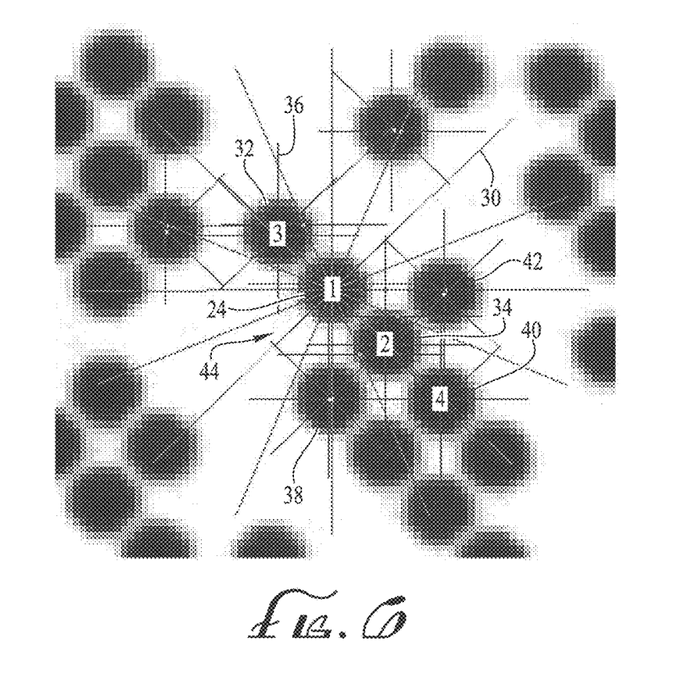

At step 310, the surrounding space is explored with an explorer radial probe 30 having a much larger reach than the measurement radial probe 28 to identify all dots proximate to the first confirmed dot 24 (see FIG. 6). In this context, the explorer radial probe 30 is a different probing process that focuses more on identifying a potential dot location rather than taking precise measurements of the dot edges. Every dot found by the explorer radial probe 30 is validated and confirmed in a similar process as described above in steps 306 and 308. In addition, because parameters (e.g., diameter, contrast, color, etc.) of the first confirmed dot 24 may be known, in some embodiments the additional dots may further be validated and confirmed if such parameters of the additional dots are consistent with the first confirmed dot 24. After all the surrounding dots have been confirmed, steps 312-318 may determine a cluster arrangement of dots including the first dot 24 and a subset of dots surrounding the first dot 24 to determine a starting pattern.

At step 312, the two dots 32, 34 closest to the first confirmed dot 24 are further analyzed to determine whether the dots 32, 34 are aligned with the first dot 24, and to determine whether the three dots 24, 32, 34 form a triplet. To determine whether the dots 24, 32, 34 form a triplet, each of the dots 32, 34 is analyzed to determine whether the dots 32, 34 are at an equal distance from the first dot 24 (which suggests the dots 32, 34 are located on opposite sides of the dot 24 as in FIG. 6). In other embodiments, the dots may be analyzed to determine whether the center-to-center distance between the first and second dots 24, 32 is the same as the center-to-center distance between the second and third dots 32, 34 (which suggests the dots 24, 32, 34 are aligned along a common direction on the grid array).

Once the first triplet of dots 24, 32, 34 has been identified, then the process continues to identify a second triplet of dots. Accordingly, at step 314, a proximity radial probe 36 is conducted for each of the dots 24, 32, 34 in the first triplet to identify nearby dots (labeled in FIG. 6 only for dot 32 for clarity). In some embodiments, the proximity radial probe 36 is a partial radial probe in that the probe does not extend to the direction corresponding to the first triplet since that direction has already been analyzed while probing for the first triplet. Because the distance for aligned, adjacent dots is known by the data reader based on the initial determinations used in identifying the first triplet of dots 24, 32, 34, the data reader uses that known distance to confirm that all adjacent dots found by the proximity radial probe 36 are at a compatible distance with the dots 24, 32, 34 in the first triplet.

Figure 7:
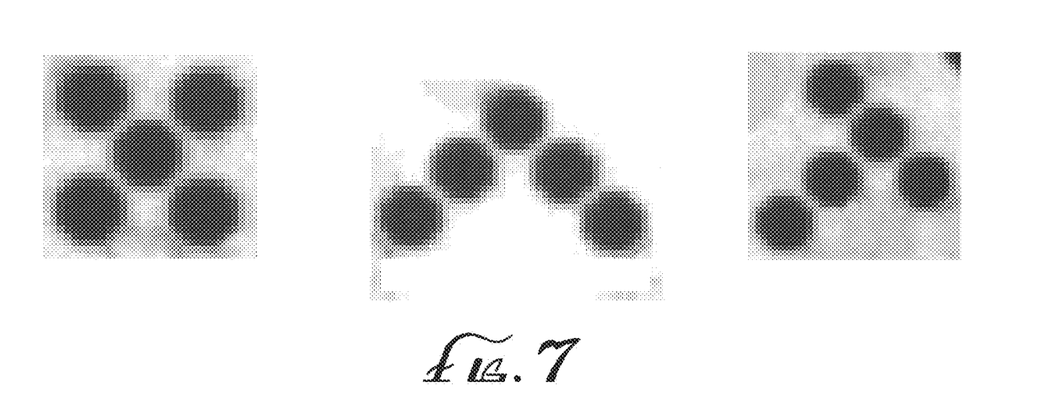

At step 316, the data reader determines whether any of the dots found by the proximity radial probe 36 are arranged in a second triplet along a direction orthogonal to the direction of the first triplet. With reference to FIG. 6, the dots 38, 42 are all identified as adjacent dots to those in the first triplet, but only dots 38, 42 are orthogonal to a dot 34 in the first triplet. As noted previously, dot 40 may not be identified by the radial probe 36 since that direction would have been previously analyzed when finding the first triplet. At step 318, the starting pattern 44 is identified when one of the three dots in the first triplet coincides with one of the dots in the second triplet. In FIG. 6, the dot 34 is common in both the first and second triplets to form an inverted T-shape. FIG. 7 illustrates potential starting patterns 44 based on a pattern of five adjacent dots, where a set of three dots is aligned along one main direction of the array and another set of three dots is aligned along the other direction of the array, where the sets share a common dot. From the starting pattern, the two modules of the code are estimated as averages between the three possible distances of the three dots for each triplet. The module is defined as the vector joining two centers of adjacent dots along the diagonal direction.

In the foregoing description, although reference is made to determining a "triplet" it should be understood that other groupings and arrangements are also contemplated as embodiments of the disclosure. Any combination of groupings of two or more dots in different directions may be identified and are contemplated as within the scope of the disclosure depending on how the starting pattern is defined by the data reader. For example, groupings of four dots may be identified. In some embodiments, the first grouping of dots may have a different length (number of dots) than the second grouping of dots.

Figure 8:
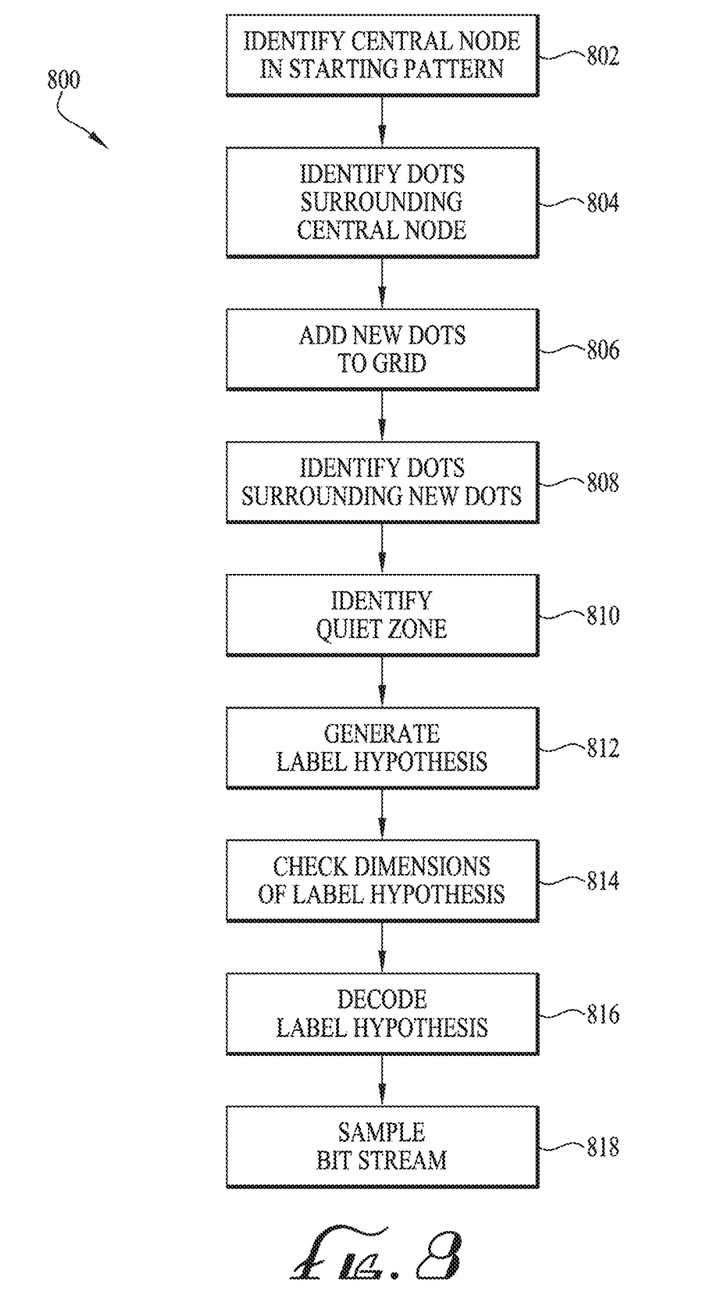
FIG. 8 is a flow chart illustrating a method for growing the grid based on the identified starting pattern to obtain the DotCode.
Figure 9:
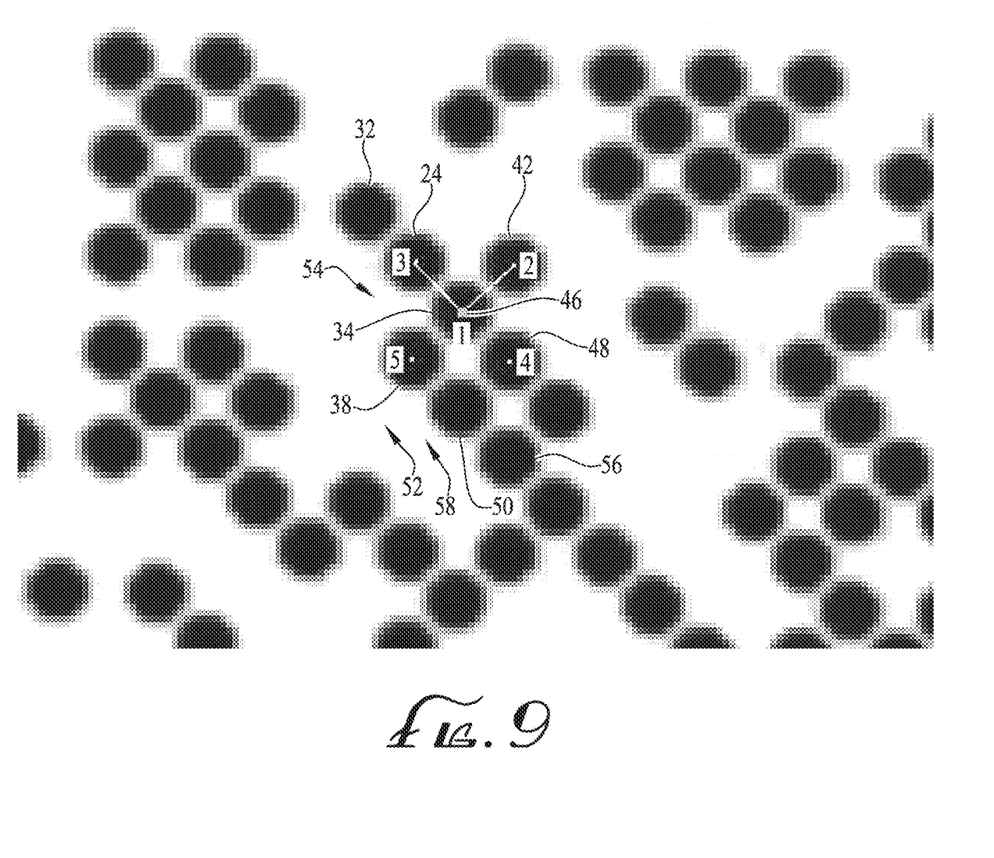
FIG. 9 is an example embodiment of DotCode symbology illustrating various details of the method steps of FIG. 8.

FIG. 8 is a flow chart illustrating a method for growing the grid from the identified starting pattern, and FIG. 9 is an enlarged portion of example DotCode symbology illustrating the various steps and details of the method 800. With collective reference to FIGS. 8-9, at step 802, the process begins by identifying a central node 46 of the starting pattern. In some embodiments, the central node 46 may be the common dot shared by the aligned triplets in the starting pattern. In other embodiments, the central node 46 may be any dot in the starting pattern. With reference to FIG. 9, dot 34 is used as the central node 46 to establish a frame of reference for the following description.

At step 804, the dots surrounding the central node 46 are identified to begin growing the grid. During this step, an estimation module may be used to estimate the hypothetical centers of dots located near the central node 46. Thereafter, a radial probe can be used to validate the dot presence and to refine the respective dot centers in a similar fashion as described in step 308 of FIG. 3. As illustrated in FIG. 9, the radial probe may be used to identify and validate the four neighboring dots, 24, 38, 42, and 48. At step 806, all new dots or blank spaces (e.g., locations where dots could be but are not found) are added to the DotCode grid. The previously found dots are not added because they were already confirmed during the analysis for identifying a starting pattern.

At step 808, the estimation and radial probing operation is repeated for all dots 24, 38, 42, and 48 found and confirmed in the initial radial probe to grow the DotCode grid and capture all dots and blank spaces surrounding those dots. For example, with reference to FIG. 9, from dot 38, the estimating and probing process will identify dot 34 and dot 50, and two blank spaces or dot absences 52, 54. Dot 50 is added to the DotCode grid, and the blank spaces 52, 54 are also added. Dot 34 is not added since it was previously identified and is being used as the central node 46. In some embodiments, after finding and confirming the four neighboring dots 24, 38, 42, and 48 in step 806, the data relating to the location of their respective refined centers may be used to update the estimation modules to better estimate an accurate increment for moving in that part of the grid prior to step 808. This updating step may help avoid issues that may be caused by perspective distortion in different parts of the label grid.

The estimating and probing process continues again from dot 50 and identifies dot 38, dot 48, dot 56, and another blank space 58. For each new dot that is found, the estimating and probing process begins with that dot and continues until all dots or blank spaces are found. Throughout the estimating and probing process, any previously found dots are skipped so that the search is limited to identifying neighboring dots that have not already been confirmed. Skipping the previously analyzed dots provides for a fast and robust algorithm that can quickly analyze and process the image to find the DotCode label.

Once all confirmed dots are found, the process continues from the absent dots or blank spaces to ensure that the DotCode grid is as complete as possible. At step 810, the grid growth process continues until the quiet zone surrounding the DotCode label has been found. As mentioned previously in FIG. 1, the quiet zone 22 is a blank area, meaning that all dots will be blanks in that location. Accordingly, the probing process may be stopped when only blank spaces are found surrounding other blank spaces. Preferably, searching beginning from blank spaces is limited to two iterations to stop the grid growth process once too many blank spaces have been found since excess blank spaces likely indicate that the quiet space of the DotCode grid has been completely identified. Thereafter, at step 812, a label hypothesis is generated by cropping the DotCode grid in a rectangular shape based on the identified quiet zone. At step 814, a dimension check is performed to confirm that the sum of the number of rows and columns is an odd number, as required by the DotCode format. If the dimension check indicates that the sum is odd, the label hypothesis is sent to a decoder unit for decoding at step 816. If not, the method 800 may be repeated in whole or in part to find the missing information. At step 816, the decoding step includes sampling of the bit stream to build the code word stream. The code word stream is sent to an error correction Reed-Solomon module. Once corrected, the code word stream is decoded and translated in the output string. Additional details and information of the Reed-Solomon module may be found in Information Technology—Automatic Identification and Data Capture Techniques—Barcode Symbology Specification—Dotcode, by Association for Automatic Identification and Mobility, published Oct. 1, 2009 (revised).

In some embodiments, the grid growth algorithm may identify other elements in the scene and misinterpret these elements as dots in a DotCode. In such events, more than one label hypothesis may be created and sent to the decoding unit, where only the correct DotCode grid will be decoded.

It should be understood that many of the features, components, and processes described in the embodiments of FIGS. 1-9 are for illustration purposes. Accordingly, one having ordinary skill in the art may rearrange the features and process steps described herein in any of the embodiments without departing from the principles of the disclosure. In addition, it is intended that subject matter disclosed in portion herein can be combined with the subject matter of one or more of other portions herein as long as such combinations are not mutually exclusive or inoperable. In addition, many variations, enhancements and modifications of the concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading method comprising:
   obtaining, via an imager, an image of an item containing an optical code symbol including a plurality of data dots;
   determining, via a processor, a starting position for identifying the optical code symbol, wherein the starting position corresponds to a first data dot of the plurality of data dots;
   analyzing, via the processor, a location of the first data dot;
   analyzing, via the processor, a first region surrounding the first data dot;
   identifying, via the processor, a subset of data dots surrounding the first data dot;
   determining, via the processor, a cluster arrangement of the first data dot and the subset of data dots;
   analyzing, via the processor, the cluster arrangement to determine a starting pattern containing the first data dot and at least one of the subset of data dots;
   analyzing, via the processor, multiple regions of the image beginning from the starting pattern to identify one or more additional data dots of the plurality of data dots in the image;
   generating, via the processor, a label hypothesis based on the first data dot, the subset of data dots, and the one or more additional data dots, wherein the label hypothesis represents the optical code symbol; and
   decoding, via a decoder unit, the label hypothesis to obtain data relating to the optical code symbol.

2. The data reading method of claim 1, wherein the step of determining the starting position further includes sampling, via the processor, a horizontal scan line of the image.

3. The data reading method of claim 2, further comprising identifying, via the processor, a local maximum or a local minimum, and comparing at least one of the local maxima or the local minima to a threshold value to locate the starting position.

4. The data reading method of claim 1, further comprising validating, via the processor, the first data dot, using a measurement radial probe to measure one or more edges of the first data dot.

5. The data reading method of claim 4, further comprising confirming the first data dot based on a determination of whether the edges measured by the measurement radial probe are symmetric and equidistant from an identified center point.

6. The data reading method of claim 1, further comprising validating, via the processor, each data dot of the subset of data dots surrounding the first data dot, using a measurement radial probe to measure one or more edges of each data dot of the subset of data dots.

7. The data reading method of claim 1, wherein the cluster arrangement includes a first triplet of data dots aligned relative to one another, and a second triplet of data dots aligned relative to one another.

8. The data reading method of claim 7, wherein the first grouping of data dots includes a first triplet of data dots, and wherein the second grouping of data dots includes a second triplet of data dots.

9. The data reading method of claim 8, wherein a center-to-center distance between each data dot in the first triplet of data dots is equal, and wherein a center-to-center distance between each data dot in the second triplet of data dots is equal.

10. The data reading method of claim 8, wherein the starting pattern includes the first triplet of data dots and the second triplet of data dots, the first and second triplet of data dots overlap along a common data dot.

11. A data reading system comprising:
    an imager configured to obtain an image of an item containing an optical code symbol including a plurality of data dots;
    a processor in operable communication with the imager, the processor configured to:
       determine a starting position for identifying the optical code symbol, wherein the starting position corresponds to a first data dot of the plurality of data dots;
       analyze the starting position of the image and validate a location of the first data dot;

analyze a first region surrounding the first data dot to identify a subset of data dots surrounding the first data dot;

determine a cluster arrangement of the first data dot and the subset of data dots;

identify a starting pattern containing the first data dot and at least one of the subset of data dots;

determine a starting pattern of the optical code based on an arrangement of the first data dot and the additional data dots;

analyze multiple regions of the image beginning from the starting pattern to identify one or more additional data dots of the plurality of data dots in the image; and generate a label hypothesis based on the first data dot, the subset of data dots, and the one or more additional data dots, wherein the label hypothesis represents the optical code symbol; and a decoder unit in operable communication with the processor, the decoder unit configured to receive the label hypothesis from the processor and decode the label hypothesis to obtain data relating to the optical code symbol.

12. The data reading system of claim 11, wherein the processor is further configured to sample a horizontal scan line of the image.

13. The data reading system of claim 12, wherein the processor is further configured to identify a local maximum or minimum, and compare at least one of the local maxima or minima to a threshold value to locate the starting position.

14. The data reading system of claim 11, wherein the processor is further configured to validate the first data dot using a measurement radial probe to measure one or more edges of the first data dot.

15. The data reading system of claim 14, wherein the processor is further configured to confirm the first data dot based on a determination of whether the edges measured by the measurement radial probe are symmetric and equidistant from an identified center point.

16. The data reading system of claim 11, wherein the processor is further configured to validate each data dot of the subset of data dots surrounding the first data dot using a measurement radial probe to measure one or more edges of each data dot of the subset of data dots.

17. The data reading system of claim 11, wherein the cluster arrangement includes a first triplet of data dots aligned relative to one another, wherein a center-to-center distance between each data dot in the first triplet of data dots is equal, and a second triplet of data dots aligned relative to one another, wherein a center-to-center distance between each data dot in the second triplet of data dots is equal.

18. The data reading system of claim 17, wherein the starting pattern includes the first triplet of data dots and the second triplet of data dots, the first and second triplet of data dots overlap along a common data dot.

19. A data reader, comprising:
an imager configured to capture an image of an optical code symbol including a data dot symbol;
a processor operably coupled with the imager, the processor configured to:
determine a first data dot within the data dot symbol;
determine a starting pattern containing the first data dot and at least two subsets of data dots that extend in different directions relative to each other;
determine additional dots within the data dot symbol at add to a data dot grid by a growth analysis extending from the starting pattern until only blank spaces are found surrounding other blank spaces; and
transmit a label hypothesis for the determined data dot grid to a decoder unit for decoding and translation to an output string.

20. The data reader of claim 19, wherein the processor is configured to perform a dimension check to determine a number of rows and columns in the data dot grid is an odd number, and if not, to continue the growth analysis to add data dots to the data dot grid.

* * * * *